US010001919B2

United States Patent
Lee et al.

(10) Patent No.: US 10,001,919 B2
(45) Date of Patent: Jun. 19, 2018

(54) APPARATUS FOR PROVIDING INTEGRATED FUNCTIONS OF DIAL AND CALCULATOR AND METHOD THEREOF

(71) Applicant: Samsung Electronics Co., Ltd, Gyeonggi-do (KR)

(72) Inventors: Kwang Min Lee, Gyeonggi-do (KR); Kyung Jung Kim, Gyeonggi-do (KR); Jeong Hun Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 14/790,390

(22) Filed: Jul. 2, 2015

(65) Prior Publication Data

US 2016/0026383 A1     Jan. 28, 2016

(30) Foreign Application Priority Data

Jul. 24, 2014    (KR) ........................ 10-2014-0094174

(51) Int. Cl.
*G06F 3/0488*     (2013.01)
*G06F 15/02*     (2006.01)

(52) U.S. Cl.
CPC ........ *G06F 3/04886* (2013.01); *G06F 3/0488* (2013.01); *G06F 15/0225* (2013.01)

(58) Field of Classification Search
CPC ............... G06F 3/04886; G06F 15/0225
See application file for complete search history.

(56) References Cited

U.S. PATENT DOCUMENTS

| 6,114,977 A * | 9/2000 | Smith ................... G06F 3/0219 341/20 |
| 8,419,303 B2 | 4/2013 | Griffin |
| 2002/0027549 A1* | 3/2002 | Hirshberg ............. G06F 3/0234 345/168 |
| 2011/0063787 A1 | 3/2011 | Griffin |
| 2011/0111806 A1* | 5/2011 | Kim .................... H04M 1/2755 455/564 |
| 2013/0212702 A1* | 8/2013 | Niglio ................. G06F 21/6218 726/28 |

FOREIGN PATENT DOCUMENTS

| JP | 2005057720 A | 3/2005 |
| KR | 20040090737 A | 10/2004 |

* cited by examiner

*Primary Examiner* — Andrea Leggett

(57) ABSTRACT

An electronic device is provided which includes an input/output interface configured to provide a plurality of number keys and function keys, a buffer configured to store a value of a key selected through the input/output interface, and a controller configured to determine, when a specific condition occurs through the input/output interface, whether the specific condition is associated with a calculation function or a telephone function and perform a telephone function or a calculation function using the stored key value based on a result of the determination. Furthermore, a delete key of the plurality of number keys and the function keys is applied in common to the calculation function and the telephone function.

20 Claims, 11 Drawing Sheets

APPARATUS FOR PROVIDING INTEGRATED FUNCTIONS OF DIAL AND CALCULATOR AND METHOD THEREOF

CROSS-REFERENCE TO RELATED APPLICATION AND CLAIM OF PRIORITY

The present application is related to and claims benefit under 35 U.S.C. § 119(a) of a Korean patent application filed on Jul. 24, 2014 in the Korean Intellectual Property Office and assigned Serial number 10-2014-0094174, the entire disclosure of which is hereby incorporated by reference.

TECHNICAL FIELD

The present disclosure relates to a technique for providing a calculation function on a dialer screen of an electronic device.

BACKGROUND

FIG. 1 illustrates screens of conventional telephone and calculator applications.

Referring to FIG. 1, a screen 10 of a telephone application may include a tap area 11 providing a menu for switching into a keypad, logs, favorites, or contacts screen, an area 13 where a dial number is displayed, and an area 15 where number keys 0 to 9 and function keys (e.g., *, #, a phone call key, a message key, a video communication key, a delete key, and the like) are displayed. A screen 20 of a calculator application may include a scroll area 21, an area 23 where calculation formula and result are displayed, and an area 25 where number keys and function (symbol) keys (e.g., operators (+, −, ÷, ×), parentheses, delete, calculation (=) key, and the like) are displayed.

As illustrated in FIG. 1, an application for a telephone function and an application for a calculation function all may include number keys and a delete key for deleting a mistyped number (or symbol) in common. However, since a conventional electronic device does not support compatibility between two functions, a user may find an application corresponding to each function to execute the found application. In other words, interfaces of a telephone application and a calculator application may be markedly similar to each other, but a calculation function using number buttons of the telephone application may not be supported.

Recently, electronic devices such as a smart phone, a tablet, and the like may basically include a telephone function and a calculator function. Furthermore, the electronic devices may provide a variety of services (applications) such as a social network service (SNS), search, map, public transportation, travel, weather, scheduling, music, video, and the like. A telephone function of functions that an electronic device provides may be used relatively frequently, but a calculation function thereof may not be frequently used. That is, many users do not tend to arrange a calculator application at an initial screen of a smart phone or a screen easy to find. Accordingly, it is inconvenient for a user to find a calculator application for simple calculation.

SUMMARY

To address the above-discussed deficiencies, it is a primary object to provide at least the advantages described below. Accordingly, an aspect of the present disclosure is to provide a device and a method capable of providing an integrated dial and calculator environment.

In accordance with an aspect of the present disclosure, an electronic device is provided. The electronic device includes an input/output interface configured to provide a plurality of number keys and function keys, a buffer configured to store a value of a key selected through the input/output interface, and a controller configured to determine, when a specific condition occurs through the input/output interface, whether the specific condition is associated with a calculation function or a telephone function and perform a telephone function or a calculation function using the stored key value based on the determination result. Furthermore, a delete key of the plurality of number keys and the function keys is applied in common to the calculation function and the telephone function.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
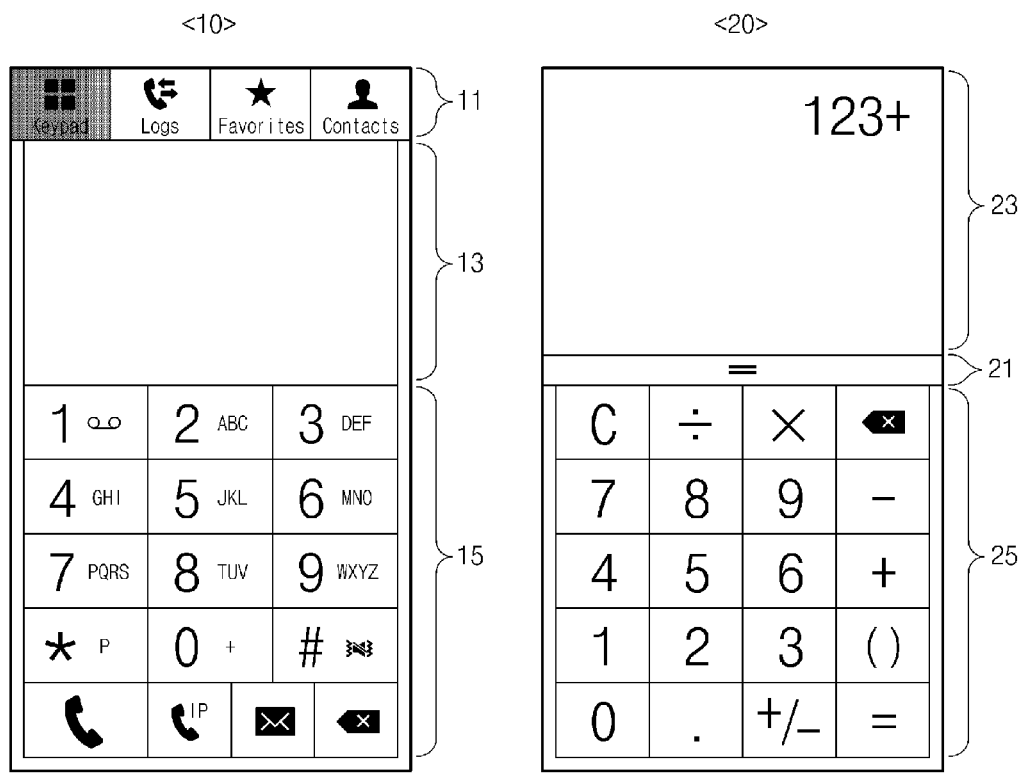
FIG. 1 illustrates screens of conventional telephone and calculator applications.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of various embodiments of the present disclosure as defined by the claims and their equivalents. The present disclosure includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The term "include," "comprise," "including." or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure may include a device with a telephone and calculation function. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances including a telephone and calculation function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, and the like.

According to various embodiments of the present disclosure, the electronic devices may include at least one of medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs)

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, and wave meters) including metal cases. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

Figure 2:
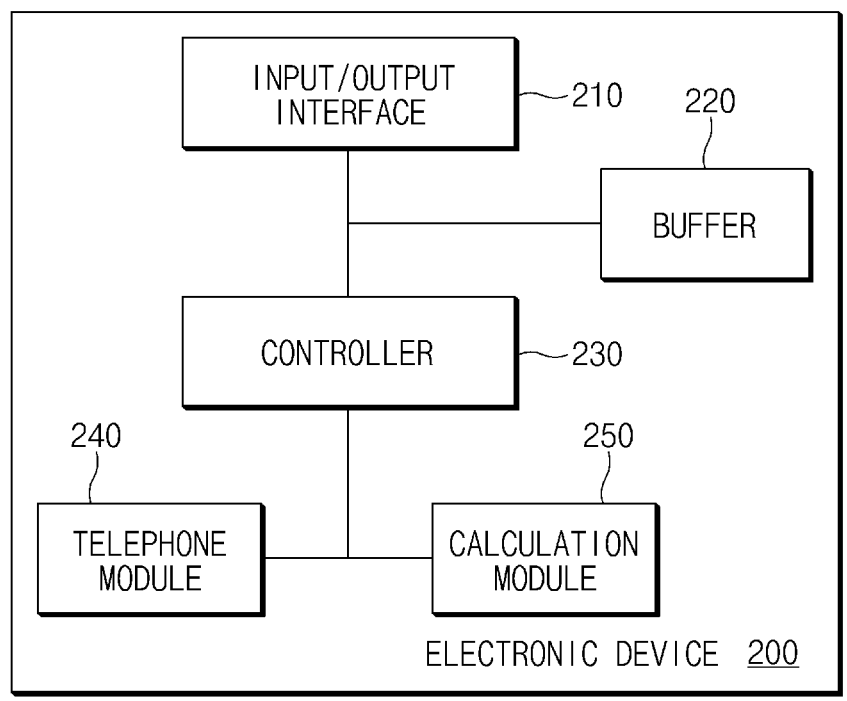
FIG. 2 illustrates a block diagram of an electronic device according to various embodiments of the present disclosure.

FIG. 2 illustrates a block diagram of an electronic device according to various embodiments of the present disclosure.

Referring to FIG. 2, an electronic device 200 may include an input/output interface 210, a buffer 220, a controller 230, and a calculation module 250. According to various embodiments of the present disclosure, the telephone module 240 and the calculation module 250 may be included in a sub module of the controller 230. According to various embodiments of the present disclosure, the telephone module 240 and the calculation module 250 may be integrated with the controller 230 so as to constitute a processor. For example, the electronic device 200 may not include the telephone module 240 and the calculation module 250 independently, and the controller 230 may perform telephone and calculation functions (or a telephone and calculation function) respectively executable by the telephone module 240 and the calculation module 250.

In various embodiments disclosed in this specification, a telephone function may include various outgoing call functions such as a voice communication outgoing call function, a video communication outgoing call function, an internet protocol (IP) communication outgoing call function, and the like. Furthermore, various embodiments of the present disclosure may be applied to a message function. For example, when a call button (e.g., an outgoing call) is selected at a state where any numbers and symbols (e.g., operators) are entered, the electronic device 200 may try to make a call using an input telephone number (e.g., input numbers and symbols). When an input (or an input allowing execution of calculation) on a calculation button instead of a call button occurs, the electronic device 200 may perform calculation based on the input numbers and symbols. In the case where a message button is selected during calculating, the input/output interface 210 of the electronic device 200 may switch a current screen into a screen for sending a message to the input telephone number. In various embodiments to be described later, the electronic device 200 will be described as performing a calculation or telephone function about input numbers and symbols based on a specific condition. However, unless specifically excluded herein, the embodiment may be comprehended as also including an operation associated with selection of a message button.

Returning to FIG. 2, the input/output interface 210 may provide a screen (e.g., a dialer) for a telephone function. For example, the input/output interface 210 may provide a screen similar to or the same as a screen 10 illustrated in FIG. 1. For example, the input/output interface 210 may include a plurality of number keys (e.g., 0 to 9) and a plurality of function keys (*, #, call, message, delete key, and the like). However, in various embodiments to be described later, it may be possible to variously change a screen that the input/output interface 210 provides. According to various embodiments of the present disclosure, number buttons and a delete button of the input/output interface 210 may be used in common to perform a telephone function and a calculation function. Buttons not used in common may be provided through a pop-up button or an interface switch/change.

In various embodiments disclosed in this specification, an input/output interface may be used as meaning of a display device that provides an input screen according to various embodiments of the present disclosure such as a dial screen for a telephone function or an input screen for a calculation function. However, in some cases, the input/output interface may be used as meaning of a screen output at a display device. For example, a change in an input/output interface may be comprehended as a change in a key arrangement or a key type output at a display device.

When a key is selected through the input/output interface 210, a value of the selected key may be stored at a buffer 220. A key value stored at the buffer 220 may continue to be output at a predetermined area (e.g., an area 13 of a screen 10 illustrated in FIG. 1) of a screen that the input/output interface 210 provides. A key value stored at the buffer 220 may be deleted (or erased) when an end event of a function (or application) occurs or when a delete key is selected. In the case of the former, all key values stored at the buffer 220 may be deleted. In the case of the latter, the last key value or a key value arranged at a specific position of an area 13 illustrated in FIG. 1 may be deleted. However, the scope and spirit of the present disclosure may not be limited thereto. For example, all stored key values may be deleted when a delete key is being pushed long. When communication or calculation is made by a call key or a calculation key, a relevant key value may be separately stored at a memory (not shown).

When a specific user input occurs through the input/output interface 210, the controller 230 may determine whether the specific user input is associated with calculation or telephone. For example, the specific user input may be selection of a call key or selection of a calculation key. According to various embodiments of the present disclosure, the calculation key may be selected by an input of a specific type (e.g., a long touch input) on a specific key (e.g., #).

For example, when the specific user input is a call input (e.g., selection of a call key), the controller 230 may perform an outgoing call using a key value stored at the buffer 220. For example, when a user pushes a call button at a state where there is entered "+1-919-265-3071" (in this case, a hyphen may be automatically entered by the electronic device 200. The hyphen may be automatically entered to allow a user to recognize numbers easily, and may be arranged at any position(s) between consecutively input numbers. The input hyphen may be ignored at a phone number processing operation.), the controller 230 may permit a call (international call) to be sent to the number. According to various embodiments of the present disclosure, the controller 230 may make it possible to dial a corresponding number through the telephone module 240 coupled to the buffer 220 or through a telephone application.

In the above-described example, when the specific user input is a calculation input (e.g., a long touch on a "#" key), the controller 230 may perform an outgoing call using a key value stored at the buffer 220. For example, in the case where a key value (or a value output at a screen) stored at the buffer 220 is "+1−919−265−3071" (here, a hyphen (-) can be recognized as a minus symbol), an international outgoing call may not be performed, but a calculation result (=−4254) may be output at a screen. According to various embodiments of the present disclosure, the controller 230 may permit the calculation formula (a stored key value) to be processed through the calculation module 250 coupled to the buffer 220 or through a calculator application.

According to various embodiments of the present disclosure, when a call input is requested, the controller 230 may process all hyphens as a meaningless symbol. When a calculation input is requested, automatically input hyphens may be removed, and hyphens intentionally entered through key selection may be processed as a minus symbol.

According to various embodiments of the present disclosure, when a new number key is selected after a calculation function is carried out, a key value stored at the buffer 220 may be reset, and the new key may be stored at the buffer 220 (and output at a screen). The same operation may be applied even after a telephone function is performed.

Figure 3:
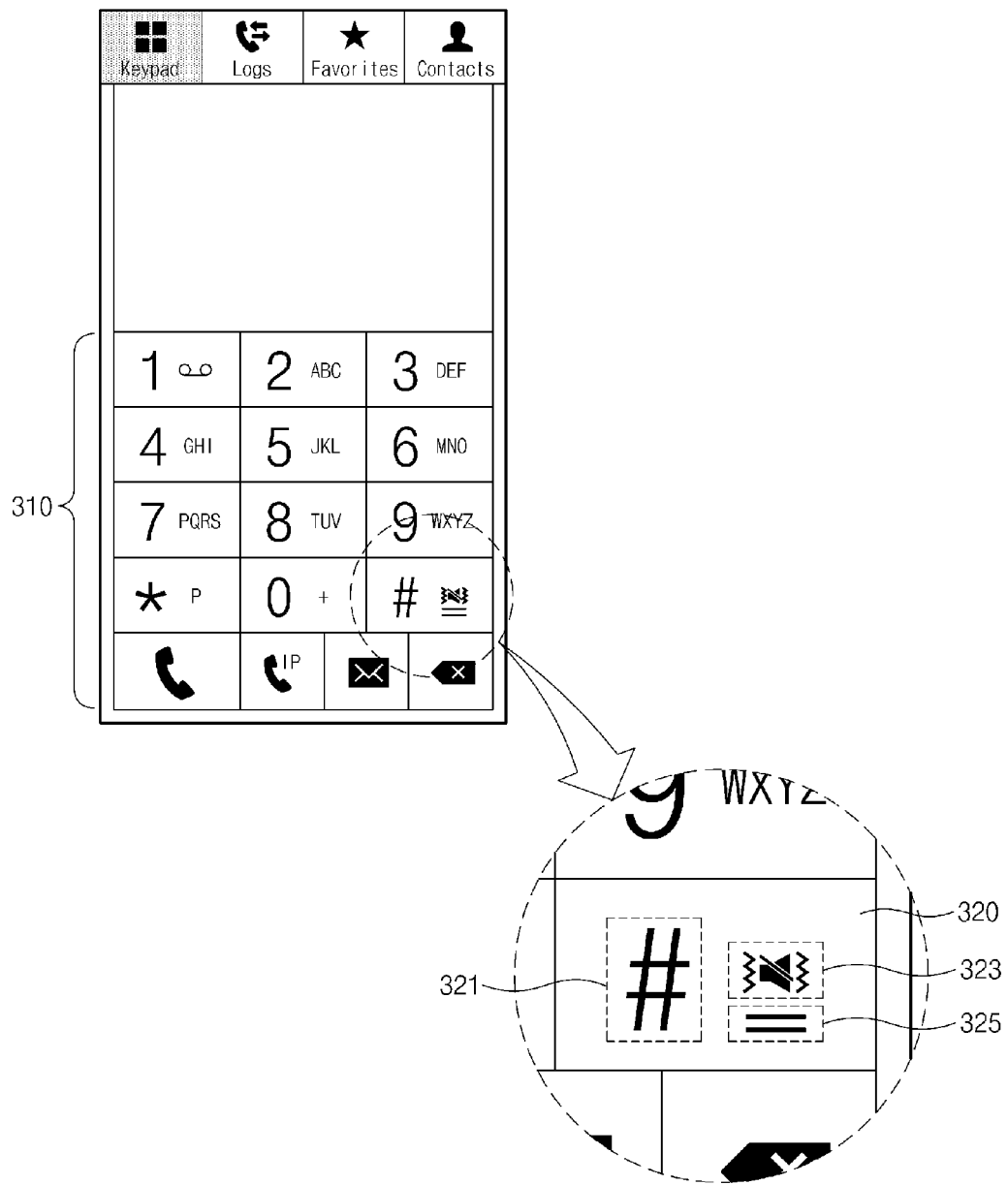
FIG. 3 illustrates a diagram of a key pad including a calculation function, according to various embodiments of the present disclosure.

FIG. 3 illustrates a diagram of a key pad including a calculation function, according to various embodiments of the present disclosure.

FIG. 3 may be comprehended as a key pad screen (e.g., an input/output interface) of a modified telephone application according to various embodiments of the present disclosure. The input/output interface may include an area 310 where a plurality of number keys and function keys are arranged.

A keypad of a conventional telephone application and a keypad of a calculator application may include number keys and a delete key in common. Accordingly, the number keys and the delete key may be used in common at an interface screen for implementing a telephone function and a calculation function. However, as compared with a keypad for a calculator, a conventional keypad for telephone may not include a key (e.g., a "=" key) corresponding to execution of calculation and may not support an input of "+" for making an international call and remaining operator keys other than an automatically input key "−". Below, an interface for providing a key corresponding to "=" will be more fully described with reference to FIG. 3, and an interface for supporting various operators will be more fully described with reference to FIG. 4.

Referring again to FIG. 3, a function corresponding to a "=" key may be assigned to any key. For example, as well as a "#" key 321, a vibration key 323 for converting an electronic device 200 into a vibration mode and a "=" key 325 may be arranged at a button area 320 in which the "#" key is included. According to various embodiments of the present disclosure, the "#" key area 320 may not include the vibration key 323 and may further include the "=" key 325.

The above-described interface may be exemplary, and the scope and spirit of the present disclosure may not be limited thereto. For example, the input/output interface 210 may include the "=" key at a "*" key area instead of the "#" key area. Alternatively, the "=" key may be arranged (or assigned) at an area corresponding to one of five segmentations of the lowermost row of an area 310 illustrated in FIG. 3. With regard to this, various embodiments will be more fully described later.

According to various embodiments of the present disclosure, a unit area provided by the input/output interface 210 may include one or more keys. For example, the unit area may include a main key (or a primary key) and a sub key (or a secondary key). The main key may be displayed most largely at the unit area or may be displayed to occupy the unit area over a constant size. The sub key may be displayed to be smaller in size than the main key, may be displayed to occupy a relatively small area, or may be displayed relatively faintly.

A user may use an input method different from an input method of the main key, to allow the sub key to be input. For example, when a shot touch and release occurs at the unit area (e.g., one of areas arranged in a matrix of FIG. 3), the electronic device 200 may recognize the shot touch and release as selection of the main key at the unit area. When a long touch input occurs at the unit area, the electronic device 200 may recognize the long touch input as selection of the sub key. In the case where a plurality of sub keys (e.g., A, B, and C) are arranged at one unit area, different sub keys may be sequentially selected according to a time when a long touch is maintained. Alternatively, a secondary window (or a pop-up button or the like) may be output so as to be associated with a selected unit area, and a plurality of sub keys may be disposed at the secondary window with a touchable size.

According to various embodiments of the present disclosure, as a key (e.g., a "=" key) allowing execution of a calculation function, a number key, not the main key, may be assigned at an area, or the main key or a unique key may be assigned at an independent unit area.

Figure 4:
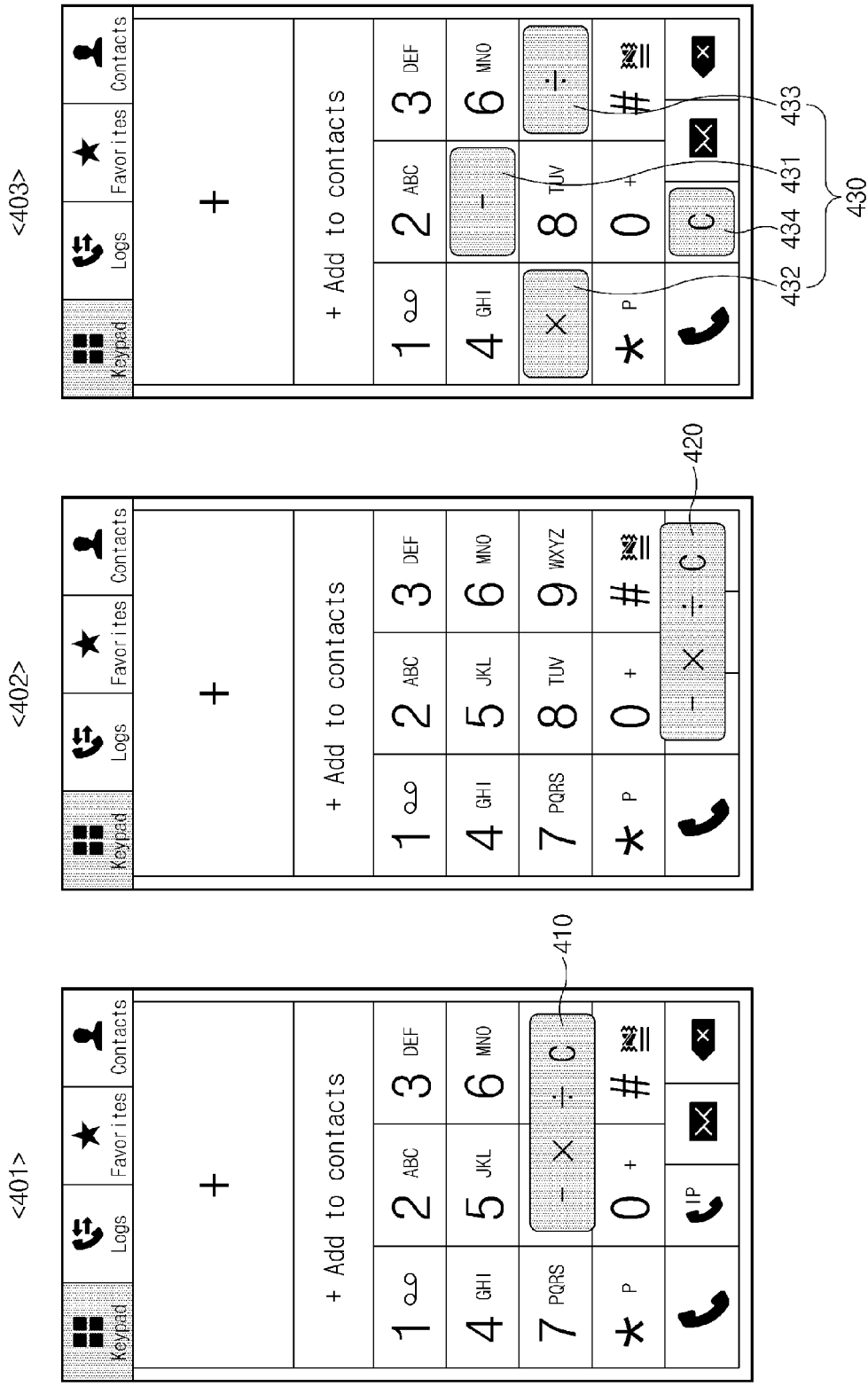
FIG. 4 illustrates a diagram of a pop-up button including operators, according to various embodiments of the present disclosure.

FIG. 4 illustrates a diagram of a pop-up button including operators, according to various embodiments of the present disclosure.

Referring to FIG. 4, an input interface screen according to various embodiments of the present disclosure may share number keys, a delete key, and the like to perform a telephone function and a calculation function. According to various embodiments of the present disclosure, operators needed to enter a formula may not be provided at an initial screen (e.g., a screen illustrated in FIG. 3), but may be provided in the form of pop-up button.

For example, in the case where a user selects a unit area of a screen 401 using a manner (e.g., a first type) in which the unit area is shortly touched, a main key of the unit area may be entered. For example, a number or a symbol such as "*" or "#" may be entered. In the case where the user selects the unit area of the screen 401 using a manner (e.g., a second type) in which the unit area is long touched, a sub key of the unit area or a pop-up button 410 including a plurality of operators may be output. Here, a long touch input may mean an input maintaining a touch on a point over a specific time.

According to an embodiment of the present disclosure, the pop-up button 410 may be output through a long touch input on any key, for example, a number key "0". In this case, the pop-up button 410 may be output at an appropriate area around the key. In the case of the screen 401, the pop-up button 410 may be output on the key so as not to be covered by an input means (e.g., a user's hand), but in the case of a screen 402, for example, a pop-up button 420 may be output at an area where function keys are disposed, to prevent a number key(s) (e.g., No. 8 or No. 9) from being covered.

According to various embodiments of the present disclosure, a pop-up button may be divided into one or more buttons. For example, in a screen 403, a pop-up button 430 may include buttons 431, 432, 433, and 434 corresponding to operators. The buttons 431, 432, 433, and 434 may be disposed at button areas adjacent to the any button. However, the scope and spirit of the present disclosure may not be limited thereto. Buttons may be output in various shapes. For example, the buttons may be output in the form of concentric circle with the any button as the center.

According to various embodiments of the present disclosure, a pop-up button may include a plurality of operators. For example, the pop-up button 410 may include operators such as subtraction (−), multiplication (×), and division (÷). Furthermore, the popup button 410 may further include an item (e.g., an item C) for executing a calculator application to perform more complex calculation. However, the scope and spirit of the present disclosure may not be limited thereto. The pop-up button 410 may further include various operators such as root (√), log, mathematical constant (e), factorial (!), and the like.

According to various embodiments of the present disclosure, when an input on an arbitrary key occurs in a specific type (e.g., a long touch), an operator assigned to the key may be entered. For example, in the case where a number key "0" is long pushed, a "+" operator (a sub key) may be output. In this case, a pop-up menu may be output together; when no input occurs during a predetermined time, an output of the "+" operator may be maintained and the pop-up menu may be closed. When an input on a specific operator (e.g., ÷) of operators included in the pop-up button occurs, an operator (e.g., +) assigned to the arbitrary key may be replaced with the specific operator and the pop-up menu may be closed. Accordingly, a user may complete a calculation formula by additionally inputting a number key(s).

According to various embodiments of the present disclosure, a "*" key (a main key) may be used as a multiplication (×) operator. In this case, for example, a user may perform a multiplication operation using number keys, the "*" key, and a "=" key (a sub key of the "*" key), without using a pop-up menu.

According to various embodiments of the present disclosure, a symbol such as a hyphen (-) may be automatically output with respect to a number key input. For example, when a user enters "01091355220", hyphens may be automatically inserted in the number string, and thus, "010-9135-5220" may be output on a screen. A position where a hyphen is inserted may vary with a nation or setting. For example, in the U.S., "010-913-55220" may be output when a user enters "01091355220".

Since not input intentionally by a user, a hyphen symbol may be removed in inputting an operator. For example, in the case of "1234×5678", a user may input number keys "1234" ("123-4" being displayed on a screen) and may select an arbitrary key (e.g., a number key "0") in a specific manner (e.g., a long touch) to allow an operator pop-up button to be output. In this case, the controller 230 may permit an automatically output symbol (e.g., a hyphen) to be deleted when an input of a specific manner occurs or when an operator pop-up button is output (if an automatically output symbol is not deleted. "123-4×5678" may be output on a screen, which does not correspond to a desired formula or notation of a user).

According to various embodiments of the present disclosure, a symbol automatically input by a system may be also processed as an operator. For example, a hyphen may be processed as subtraction, and a star "*" may be processed as multiplication (×). When a user inputs a calculation button instead of a telephone button (for fun), with "010−9135−5220" entered, the controller 230 (or the calculation module 250) may return a result value (i.e., −14345).

According to various embodiments of the present disclosure, in the case where a calculation function is performed, an electronic device may return (or output) a result value (e.g., −14345) or both a calculation formula and a result value (e.g., 010−9135−5220=−14345).

Figure 5:
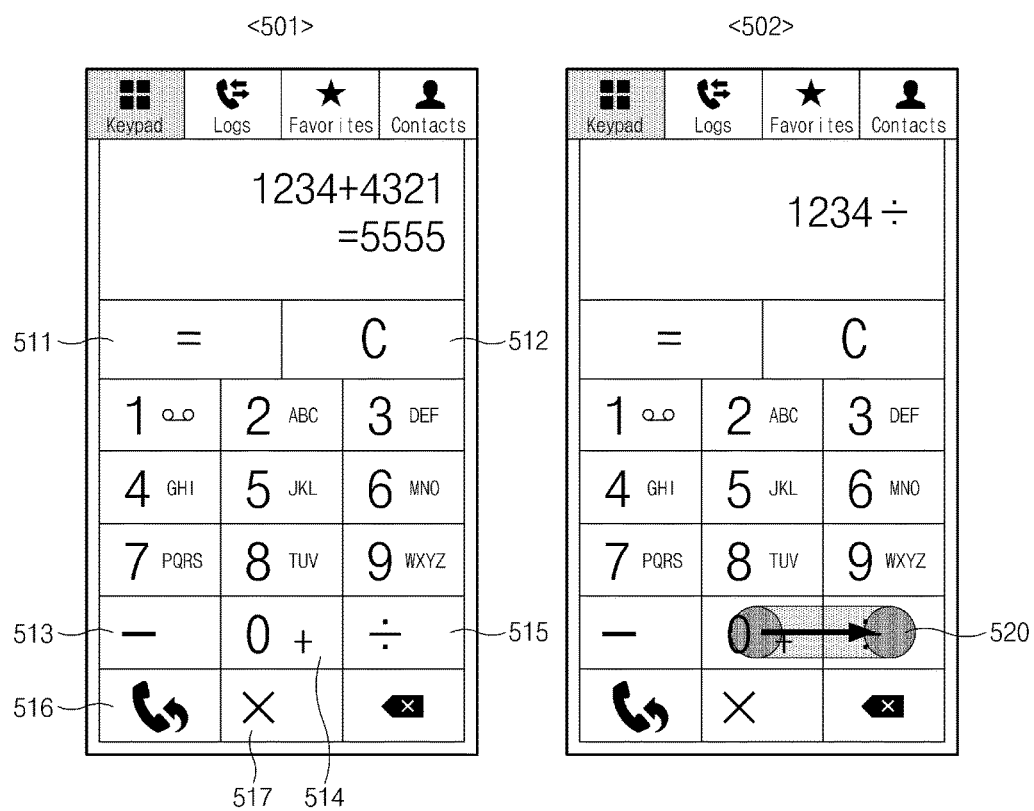
FIG. 5 illustrates a diagram of an input/output interface supporting a calculation function, according to various embodiments of the present disclosure.

FIG. 5 illustrates a diagram of an input/output interface supporting a calculation function, according to various embodiments of the present disclosure.

An input/output interface illustrated in FIG. 5 may further include the following operator keys that a conventional dial pad does not provide: −, +, ÷, ×, =, C (clear) corresponding to keys 513, 514, 515, 517, 511, and 512. Furthermore, a screen 501 may not provide the following function keys not associated with a calculation function: *, #, and a key associated with a call/message. Instead, the screen 501 may provide a key 516 for switching into a telephone mode.

When a specific condition occurs, an electronic device 200 may switch a general dial input pad screen (e.g., a screen 10 illustrated in FIG. 1 or a screen illustrated n FIG. 3) into an input/output interface such as the screen 501 illustrated in FIG. 5. In this case, some keys (e.g., number keys and a delete key) may be maintained, but other keys (e.g., a key which is associated with a telephone function but is not associated with a calculation function) may be changed. Furthermore, a key for execution of a calculation function may be added to a predetermined area. To sum up, when a user input satisfies a specific condition, the electronic device 200 (e.g., a controller 230) may permit at least a portion of an initial input/output interface to be changed to an interface for performing a calculation function. As described above, according to various embodiments of the present disclosure, the electronic device 200 may provide a dual input/output interface instead of the above-described pop-up button.

According to various embodiments of the present disclosure, when a user's input is determined as a user wants to use a calculation function, the controller 230 may make it possible to change the input/output interface. For example, as a sub key, a "+" key may be input when a user pushes a number "0" during a long time at a state where no number key value is stored at a buffer or at a state where the user does not input a number key after last call or calculation. This case may be determined by the controller 230 as a dial is being input to make an international call (the probability that a "+" key is input at the beginning of a calculation formula for a positive number input is very low). However, when a "+" key is input at a state where some numbers (e.g., 1234) are previously input, the controller 230 may change an input/output interface to an input/output interface for executing a calculation function because a telephone number of such a format (e.g., 1234+4321) does not exist.

To sum up, the specific condition may correspond to whether a combination of keys stored according to a user input satisfies at least a portion of a telephone number format. For example, the specific condition may be whether a number(s) received before an input of an operator exists (or a number key stored at a buffer exists). In the case where a combination of stored keys does not satisfies at least a portion of a telephone number format, an input/output interface for a basic telephone function may be changed to an input/output interface for performing a calculation function. For example, when a number received before an input of a "+" operator exists, the controller 230 may make it possible to change an input/output interface.

Some input key values may be deleted using a delete key, with an interface changed to an input/output interface for a calculation function. As a result of deletion, a combination of input keys may satisfy a telephone number format. For example, in the case where "+9135" is deleted using the delete key at a state where "8210+9135" is received. "8210" may satisfy a telephone number format (e.g., +82-10-9135-5220). In this case, the controller 230 may switch an interface to an input/output interface for a telephone function, generate a notification window asking whether to return, or maintain an input/output interface for a calculation function. In the case where the controller 230 maintains an input/output interface for a calculation function, a user may select a predetermined key (e.g., a key 516) of an input/output interface for a calculation function to return to an input/output interface for a telephone function.

According to various embodiments of the present disclosure, an input/output interface may be changed according to different conditions. For example, in the case where a user wants to input "+" using an interface such as a screen 502, it may be sufficient to push a "0" key long. However, when an input point is changed at a state where a number "0" is pushed (i.e., a touch and drag input), various operators may be output around the number "0". A desired operator may be input by moving a touch point to a user-desired operator and releasing a touch.

The specific condition may correspond to whether or not of a touch and drag input on an arbitrary number key. In this case, as soon as a touch is released, a corresponding operator may be input and an interface may automatically return to an original interface. However, according to various embodiments of the present disclosure, a changed screen may be maintained until a predetermined key (e.g., a key 516) is selected.

The above-described method may be one of various methods for inputting an operator, and the scope and spirit of the present disclosure may not be limited thereto. For example, a user may input an operator in a manner in which the user freely draws a predetermined pattern on a screen using a stylus, such as a stylus pen (S-pen), or a finger. For example, in an embodiment illustrated in FIG. 1, a user may freely input an operator symbol at an area 13 using a touch pen and the like, and an electronic device may analyze the input to replace it with an operator symbol. As another example, a user may input an operator by drawing a predetermined pattern on a button of an area 15. For example, an electronic device may recognize an input ("4-5-6") connecting number keys 4, 5, and 6 as a "−" input, an input connecting "4-5-6" and "2-5-8" as a "+" input, an input connecting "1-5-9" and "3-5-7" as a "×" input, and an input connecting "3-5-7" as a "÷" input. Various modified embodiments may be possible. For example, when an input connecting "4-5-6", an input on "2", and an input on "8" occur respectively, an electronic device may recognize such inputs as "÷". Furthermore, according to various embodiments of the present disclosure, an electronic device may recognize a freely input pattern without separation between "13" and "15" and may process the recognized pattern as an operator.

The above-described conditions may be combined. Furthermore, an embodiment described with reference to FIG. 5 may be combined with an embodiment described with reference to FIG. 4.

According to various embodiments of the present disclosure, even though input/output interfaces are changed each other, key values stored at a buffer 220 may be retained.

Figure 6:
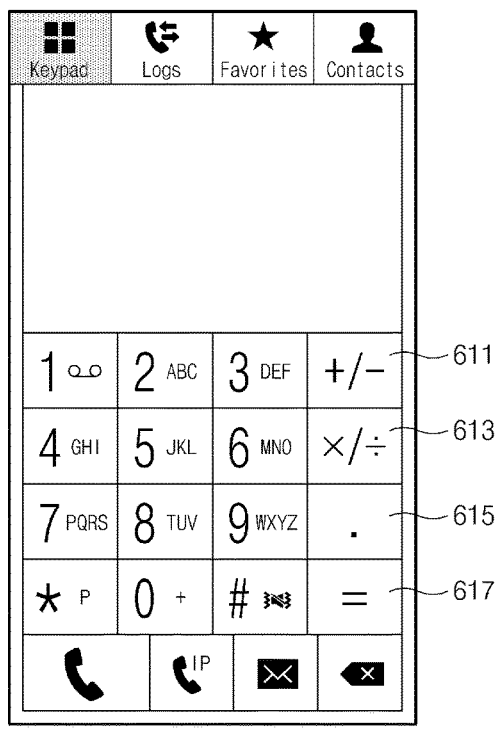
FIG. 6 illustrates a diagram of an input/output interface providing a telephone function and a calculation function, according to various embodiments of the present disclosure.
Figure 6:
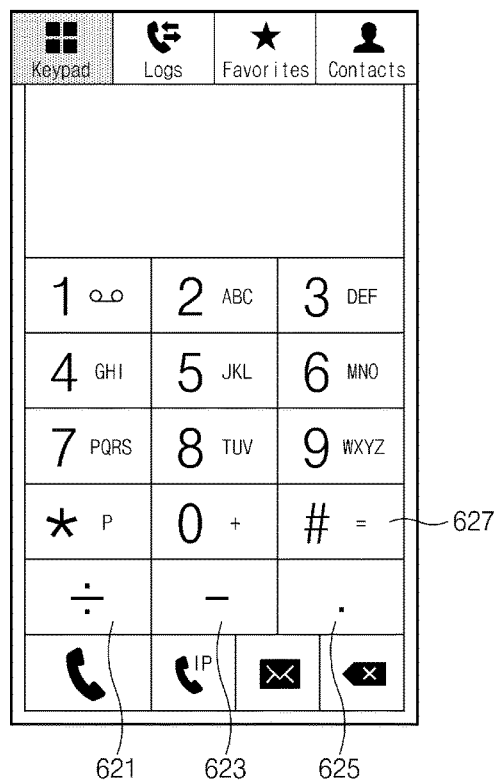

FIG. 6 illustrates a diagram of an input/output interface providing a telephone function and a calculation function, according to various embodiments of the present disclosure.

Referring to FIG. 6, various embodiments of the present disclosure may provide an input/output interface in which a calculation function and a telephone function are integrated. For example, the input/output interface may include a plurality of operator keys for calculation as well as a plurality of number keys and a function key. For example, a screen 601 may further include a "+/−" key 611, a "×/"" key 613, a decimal point (.) 615, and a "=" key 617 together with a general dial key. Furthermore, for example, in a screen 602, a "+" operator and a "=" operator may be assigned to a "0" key and a sub key of a "#" key, respectively, a "×" operator may be assigned to a main key of a "*" key, and each of a "÷" operation, a "−" operator, and a decimal point (.) may be assigned to a new key (keys 621, 623, and 625).

According to various embodiments of the present disclosure, number keys and a delete key may be used in common in a calculation function and a telephone function. Furthermore, as well as the number keys and the delete key, another key such as "+/−" may be used in common in the calculation function and the telephone function. For example, in the case of making an international call, in general, a user may push a number "0" long to input a "+" symbol, but a "+" key received through the "+/−" key 611 may be also used to make an international call. According to various embodiments of the present disclosure, as well as a hyphen (-) key input by a system, a "-" key input through a key 611 may be recognized as a hyphen in performing a telephone function. The inverse of the above-described embodiment may be applicable in a corresponding manner.

In the screen 601, the "+/−" key 611 or the "×/÷" key 613 may be selected by various manners. For example, a "+" key may be selected when a first type input (e.g., a short touch and release) occurs, and a "−" key may be selected when a second type input (e.g., a long touch) occurs. In an equation, two or more operators such as "+−" or "×÷" may not be continuously input. For this reason, an operator may be input in a manner where an input symbol "+" is changed to "−", when a key 611 is again selected at a state where "+" is input.

In the above-described embodiments, a buffer 220 may store a calculation formula input through an input/output interface 210. When a final user input is not an input (e.g., a "=" key) indicating execution of calculation but a key (e.g., a call key) indicating an outgoing call, a controller 230 may process operators included in the input calculation formula so as not to be recognized. In particular, in the case where the input/output interface 210 supports an integrated user interface (UI) environment for a telephone function and a calculation function, a user may mistype an operator symbol or an operator symbol may be input by mistake. In this case, it may be possible to making a call without deleting a relevant operator. For example, even though a "+" button is input by mistake when a user inputs a telephone number "01091355220", the controller 230 may ignore a "+" operator when a telephone button is selected and may make it possible to make a call to "01091355220" using number key information.

However, according to various embodiments of the present disclosure, the controller 230 may provide a revision request on a key inappropriate to perform a telephone function. For example, the controller 230 may perform the following operation: an output of a message (e.g., a pop-up) indicating that a corresponding number is not a telephone number, an output of a message inquiring whether to perform calculation, or an output of a message indicating waiting of revision after moving a cursor of a corresponding operator.

An electronic device according to various embodiments of the present disclosure may perform outputting an input/output interface in response to execution of a telephone function, storing values of keys selected at the input/output interface, and performing a calculation function based on the stored key values when an input associated with a calculation function occurs, and may perform a telephone function based on the stored key values when an input associated with a telephone function occurs.

The electronic device according to various embodiments of the present disclosure may include an input/output interface configured to provide a plurality of number keys and function keys, a buffer configured to store a value of a key selected through the input/output interface, and a controller configured to determine, when a specific condition occurs through the input/output interface, whether the specific condition is associated with a calculation function or a telephone function and perform a telephone function or a calculation function using the stored key values, based on the determination result. Furthermore, a delete key of the plurality of number keys and the function keys may be applied in common to the calculation function and the telephone function.

According to various embodiments of the present disclosure, the buffer may store a number corresponding to an arbitrary key when a first type input occurs with respect to the arbitrary key of the plurality of number keys, and the controller may output a pop-up button including a plurality of operators for executing the calculation function to the input/output interface when a second type input occurs with respect to the arbitrary key.

According to various embodiments of the present disclosure, the second type input may be a long touch on the arbitrary key, and the plurality of operators may include at least two of four arithmetical operators. Furthermore, the pop-up button may further include a button for switching into a calculator application.

According to various embodiments of the present disclosure, the pop-up button may include buttons on the operators arranged at a button area adjacent to the arbitrary key.

According to various embodiments of the present disclosure, the controller may generate a key input on an operator assigned to the arbitrary key when the second type input occurs with respect to the arbitrary key. Furthermore, when an input on a specific operator of a plurality of operators included in the pop-up button occurs, the controller may replace a key input on an operator assigned to the arbitrary key with an input on the specific operator.

According to various embodiments of the present disclosure, a symbol automatically output when the first type input occurs may be deleted when the second type input occurs.

According to various embodiments of the present disclosure, the input/output interface may be configured to further provide a plurality of operator keys for performing the calculation.

According to various embodiments of the present disclosure, when the user input satisfies a specific condition, the controller may allow at least a portion of the input/output interface to switch into an interface for performing a calculation function.

According to various embodiments of the present disclosure, the specific condition may include whether a combination of stored keys satisfies at least a portion of a telephone number format, and the controller may allow the input/output interface to switch when a combination of the stored keys does not satisfy at least a portion of the telephone number format.

According to various embodiments of the present disclosure, the specific condition may include whether or not of a touch and drag input on an arbitrary number key, and the controller may allow the input/output interface to change when the touch and drag input occurs. Furthermore, the buffer may retain key values stored therein when the input/output interface is changed.

According to various embodiments of the present disclosure, the buffer may store a calculation formula input through the input/output interface, and the controller may process at least one operator included in the calculation formula so as not to be recognized when the specific condition is associated with a telephone function.

Figure 7:
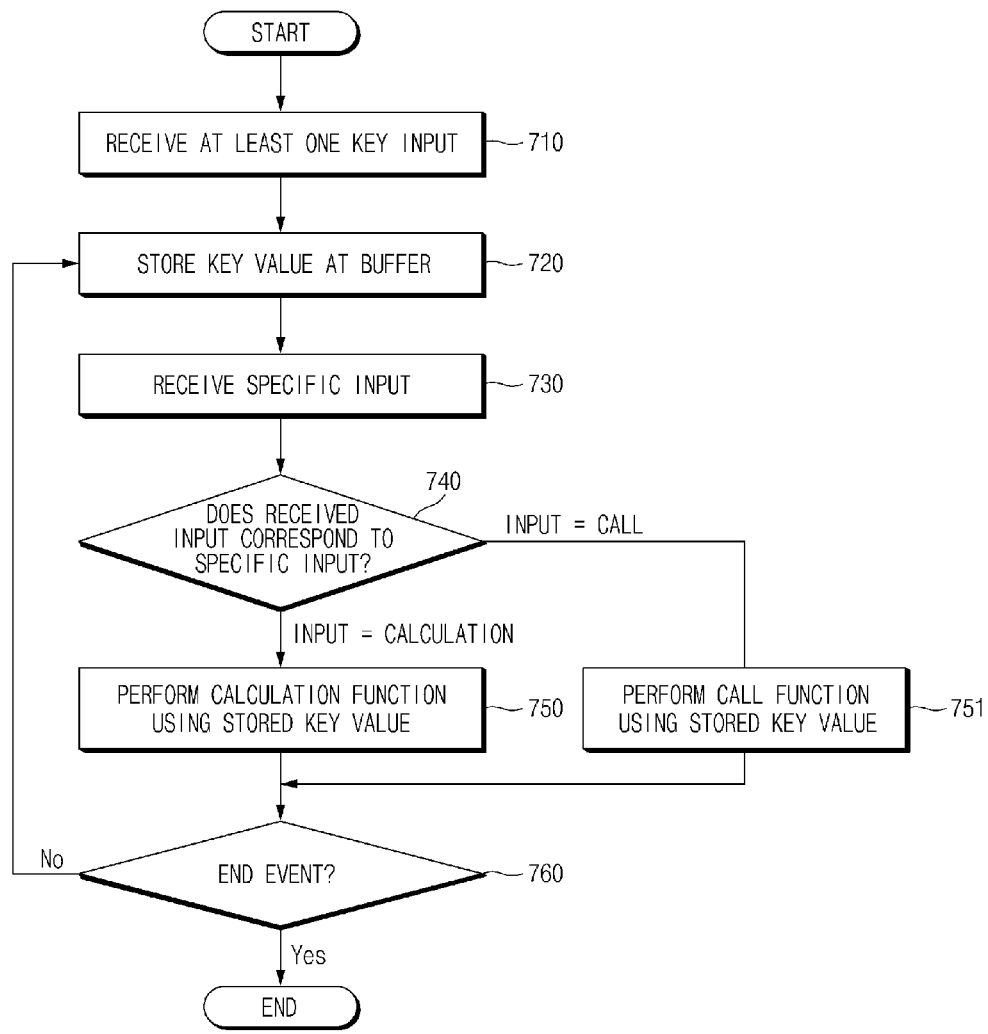
FIG. 7 illustrates a flowchart for a calculation function providing process according to various embodiments of the present disclosure.

FIG. 7 illustrates a flowchart for a calculation function providing process according to various embodiments of the present disclosure.

Referring to FIG. 7, in operation 710, an electronic device (e.g., an electronic device 200) may receive at least one key input. For example, the electronic device 200 may receive an input on a number key through an input/output interface 210. Furthermore, the electronic device 200 may receive an input on an operator key or a "+" key for making an international call. Operation 710 may be repeatedly performed.

In operation 720, the electronic device may store a value of an input key at a buffer (e.g., a buffer 220). A key value stored at the buffer may be output through a display device. Information output to the display device may correspond to information stored at the buffer or may further include an additional symbol (e.g., a hyphen or the like). For example, in the case where a user inputs "0221885220" using number keys, information on "0221885220" may be stored at the buffer, but the form of "02-2188-5220" may be output through the display device. According to various embodiments of the present disclosure, the buffer may store information on a symbol (e.g., a hyphen) automatically input by a system or the like.

In operation 730, the electronic device may receive a specific input. The specific input may be, for example, one of an input for performing a calculation function or an input for a call function.

In operation 740, the electronic device may determine an attribute of the specific input. For example, in the case where the specific input is an input for performing a calculation function, the process may proceed to operation 750. Otherwise (i.e., in the case where the specific input is an input for performing a call function,), the process may proceed to operation 751. If the specific input is an input for sending a message (not shown), as described above, the electronic device may switch into an interface for sending a message.

In operation 750, the electronic device may perform a calculation function using a key value stored at a buffer. The electronic device may perform the calculation function using various methods described with reference to FIGS. 2 to 6.

In operation 751, the electronic device may perform a call function using the stored key value. According to an embodiment of the present disclosure, even though the key value stored at the buffer includes the form of calculation formula, as described above, the electronic device may ignore an operator(s) and may perform the call function.

In operation 760, the electronic device may determine whether an end event occurs. For example, in the case where an application is ended, the electronic device enters a lock state, a screen is turned off, a power of the electronic device is turned off, or a reset key is selected, the electronic device may recognize such a case as the end event and may reset a value(s) stored at the buffer. In the case where the end event is not recognized, the electronic device may store a calculation formula or an outgoing call number. The stored calculation formula may be used as a telephone number. For example, in the case where a calculation formula of "123+4567" is used as a telephone number, it may be changed to "123-4567" of a telephone number format and may be used to make a call. According to various embodiments of the present disclosure, a calculation result stored at the buffer may be used as a telephone number.

Figure 8:
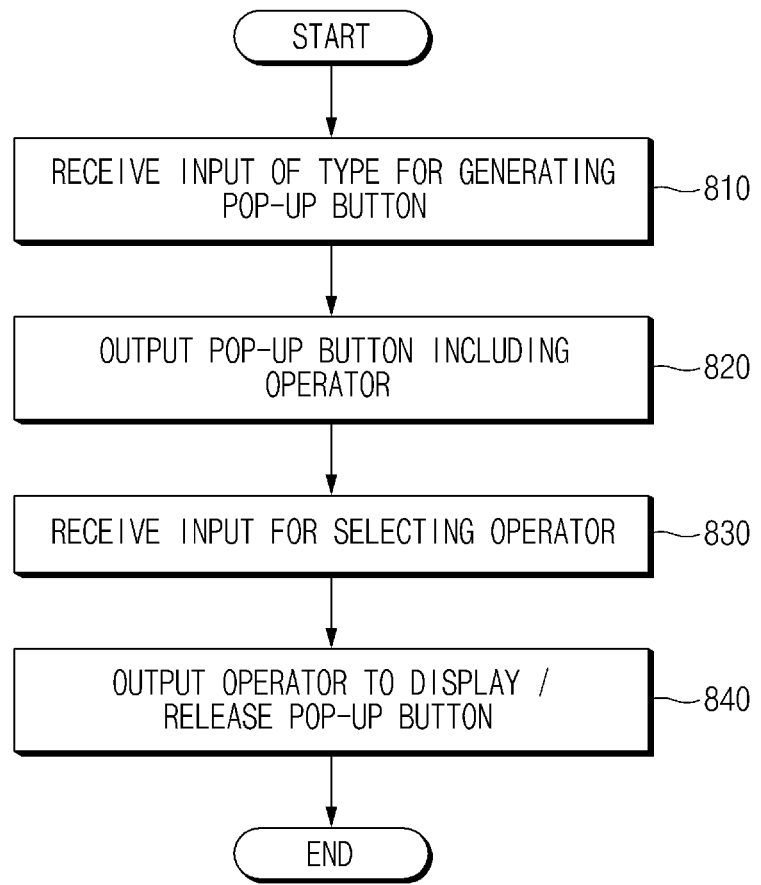
FIG. 8 illustrates a flowchart for a pop-up button display process according to various embodiments of the present disclosure.

FIG. 8 illustrates a flowchart for a pop-up button display process according to various embodiments of the present disclosure.

Referring to FIG. 8, in operation 810, an electronic device may receive an input having a type for generating a pop-up button. For example, the electronic device may receive a specific type of input on an arbitrary key. For example, assuming that a first type input is defined as a short touch input and a second type input is defined as a long touch input, a number may be input by selecting a specific key (e.g., a number (0) key) in a first-type input manner, but a pop-up button for inputting an operator may be output by selecting a specific key in a second-type input manner.

In operation 820, the electronic device may output a pop-up button including an operator(s) in response to an input received in operation 810. The pop-up button may be output in such a way that one button includes a plurality of operators or in such a way that one button includes one operator.

In operation 830, the electronic device may receive an input for selecting one of a plurality of operators that the pop-up button provides.

In operation 840, the electronic device may output an operator selected according to an input received in operation 830 and may allow the pop-up button to disappear. In this case, if an operator (e.g., a "+" operator) is automatically input in response to an input received in operation 810, the operator may be replaced with the selected operator.

Figure 9:
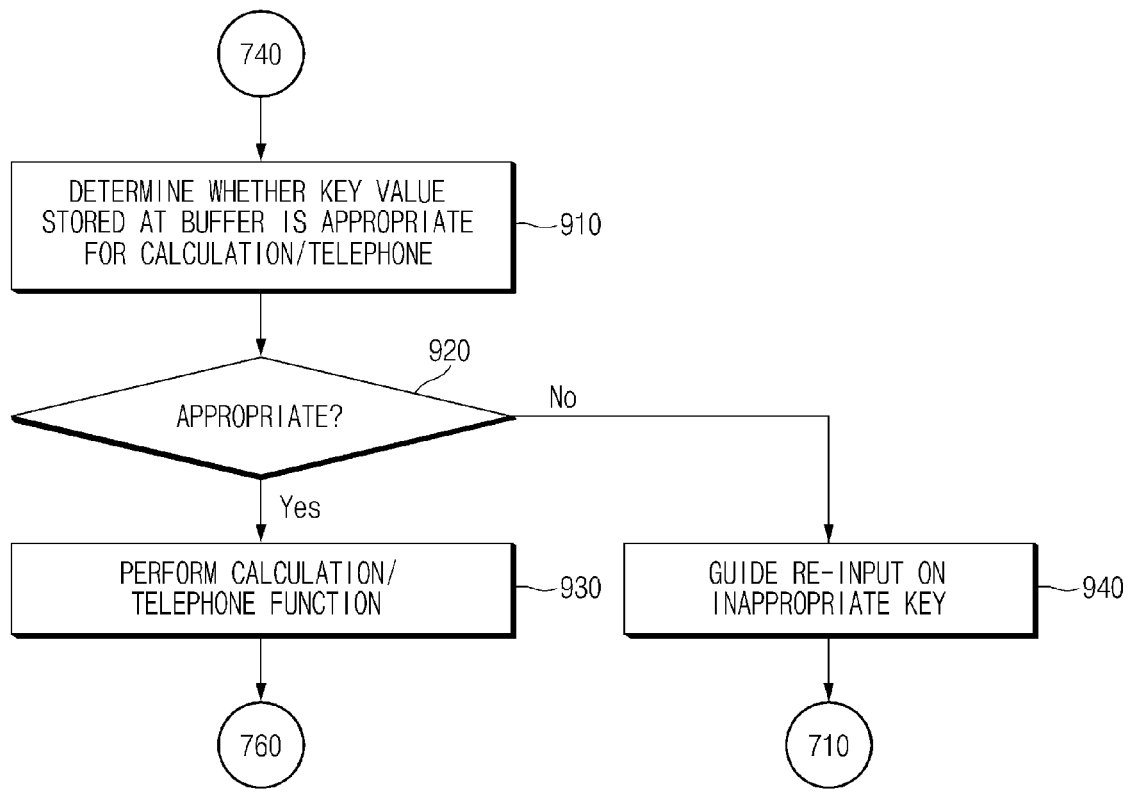
FIG. 9 illustrates a flowchart for a process for determining whether a key value is valid, according to various embodiments of the present disclosure.

FIG. 9 illustrates a flowchart for a process for determining whether a key value is valid, according to various embodiments of the present disclosure.

A process illustrated in FIG. 9 may be executed using some operations of a process illustrated in FIG. 7 as a start point. However, the scope and spirit of the present disclosure may not be limited thereto. For example, the process illustrated in FIG. 9 may be executed using an appropriate operation of a process described with reference to FIG. 7 or 8 as a start point.

Referring to FIG. 9, in operation 910, when a specific input in operation 740 is to perform a calculation function or to perform a telephone function, an electronic device may determine whether a key value stored at a buffer is appropriate to perform a calculation function or a telephone function. Below, the present disclosure will be described with regard to the telephone function. However, it may be comprehended by one skilled in the art that a corresponding description is applied to the calculation function.

For example, in the case where a specific input in operation 740 is a call key, in operation 910, the electronic device may determine whether a key value stored at the buffer is appropriate to make a phone call. As a consequence of determining that a key value stored at the buffer is appropriate to make a phone call, in operation 930, the electronic device may perform an outgoing call function. For example, in the case where the stored key value does not include any operator, includes only a "-" operator or a "+" operator for making an international phone call, or includes a length condition of specific numbers (e.g., three or more numbers such as "911" or less than 16 numbers considering an international call), the electronic device may determine the stored key value as being appropriate to make a phone call and may make a phone call.

However, in the case where the stored key value is determined as being inappropriate to perform a telephone function due to multiplication, division, decimal point, and the like included in the stored key value, the process may proceed to operation 940. In operation 940, the electronic device may guide a re-input on an inappropriate key. For example, in the case where an input key value is very long or short to use the input key value as a telephone number such as "0112358132134558914423377" or in the case where the input key value is determined as being inappropriate to perform a telephone function due to an operator(s) put between numbers, the electronic device may guide a re-input on an inappropriate key. For example, the electronic device may provide a message for a re-input and may perform an operation of locating a cursor at a re-input place. Furthermore, the electronic device may perform a process for executing a telephone function normally, for example, by changing a key determined as an inappropriate key to an appropriate key. For example, in the case where a telephone function is selected at a state where "123+4567" is input, the electronic device may automatically convert "123+4567" to "123-4567" to make a phone call, or may delete an operator to make a phone call as if "1234567" is input.

The above-described embodiments may be applied when an electronic device remains at a lock state. For example, since a calculation function is not associated with security, the above-described embodiments may operate at a keypad screen (e.g., a keypad screen provided for a password input or an urgent call) provided when the electronic device remains at a lock state. For example, interfaces described with reference to FIGS. 3 to 6 may be provided at a lock state. The electronic device may receive an input on at least one key at a lock state and may perform a succeeding calculation function. In this case, since the electronic device remains at a lock state, a general call function excluding an urgent call may not be performed. As such, a user may conveniently use a calculation function without the following steps: releasing security, searching for a calculator application, and executing the calculator application.

The above-described embodiments may be applied when the electronic device remains at a call state. For example, the electronic device may import a keypad screen during calling. For example, the above-described input/output interfaces may be provided at a call state. The electronic device may receive an input on at least one key at a call state and may perform a following calculation function. For example, in the case where an automated response system (ARS) input or calculation is needed in the middle of a conversion, a user may input a number(s) and an operator. Input key values may be stored at a buffer, and calculation may be performed when a specific input (e.g., a "=" key) occurs. In the case of the ARS input, an input key value may be stored at the buffer, and it may be transferred to ARS after a time elapses. Furthermore, a storage value may be retained, and afterwards, calculation may be performed using previously input key information.

According to various embodiments of the present disclosure, when a set of keys are input in the middle of a conversation, an electronic device may stop execution of a dual-tone multi-frequency (DTMF) function. For example, when an input not associated with a call such as an operator or a "=" key is provided, the electronic device may not perform the DTMF function. In this case, even though a calculation function is performed in the middle of a conversion, a user may hold conversation with the other party without interference or noise because no sound occurs upon selecting a button (a number key).

According to various embodiments of the present disclosure, a method for providing a calculation function using a dial of an electronic device may include receiving an input on at least one key from a user, storing a key value selected by the input at a buffer, receiving a specific input from a user, determining whether the specific input is associated with a calculation function or a telephone function, and performing a telephone function or a calculation function using the stored key value, based on the determination result.

According to various embodiments of the present disclosure, the method may further include providing an input/output interface including at least one number key at a lock state of the electronic device, and an input on the at least one key may be performed at the lock state.

According to various embodiments of the present disclosure, the method may further include providing an input/output interface including the at least one number key at a call state of the electronic device, and the input on the at least one key may be performed at the call state. Furthermore, the method may further include stopping a dual-tone multi-frequency (DTMF) function when a specific key is selected at the input/output interface.

According to various embodiments of the present disclosure, the method may further include processing an inappropriate key to be appropriate to perform the telephone function or the calculation function, when the stored key value includes the inappropriate key inappropriate to perform the telephone function or the calculation function.

Figure 10:
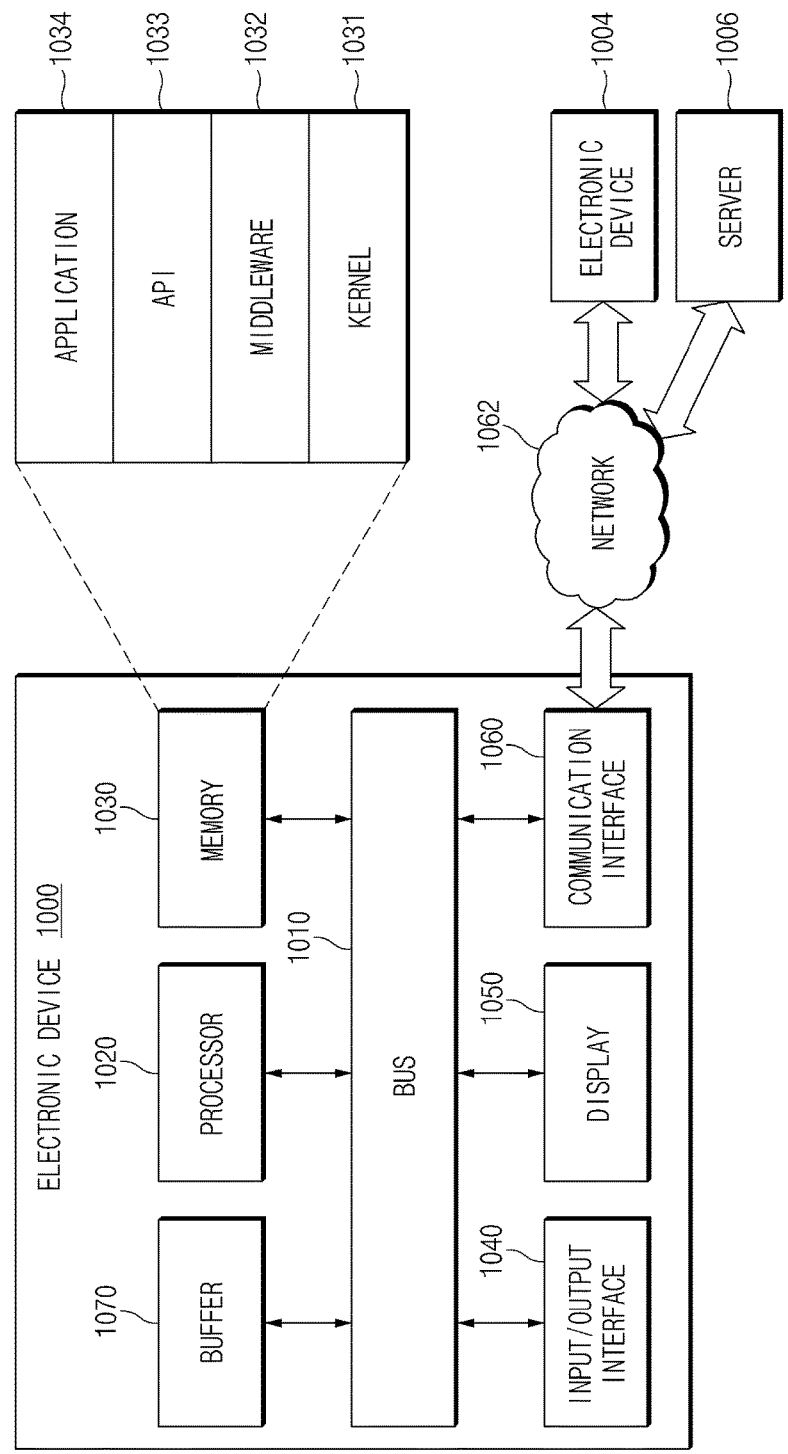
FIG. 10 illustrates a diagram of a network environment of an electronic device according to various embodiments of the present disclosure.

FIG. 10 illustrates a diagram of a network environment including an electronic device according to various embodiments of the present disclosure.

Referring to FIG. 10, an electronic device 1000 may include a bus 1010, a processor 1020, a memory 1030, an input/output interface 1040, a display 1050, a communication interface 1060, and a buffer 1070.

The bus 1010 may interconnect the above-described components and may be a circuit for conveying communications (e.g., a control message) among the above-described components.

The processor 1020 may receive, for example, instructions from the above-described other components (e.g., the memory 1030, the input/output interface 1040, the display 1050, the communication interface 1060, the buffer 1070, and the like) through the bus 1010, may decode the received instructions, and may perform data processing or operations according to the decoded instructions. For example, the processor 1020 may correspond to at least one of a controller 230, a telephone module 240, or a calculation module 250 above described.

The memory 1030 may store instructions or data received from the processor 1020 or other components (e.g., the input/output interface 1040, the display 1050, the communication interface 1060, the buffer 1070, and the like) or generated by the processor 1020 or the other components. The memory 1030 may include, for example, programming modules such as a kernel 1031, a middleware 1032, an application processing interface (API) 1033, an application 1034, and the like. Each of the above-described programming modules may be implemented in the form of software, firmware, hardware, or a combination of at least two thereof.

The kernel 1031 may control or manage system resources (e.g., the bus 1010, the processor 1020, the memory 1030, and the like) that are used to execute operations or functions of remaining other programming modules, for example, the middleware 1032, the API 1033, or the application 1034. Furthermore, the kernel 1031 may provide an interface that allows the middleware 1032, the API 1033, or the application 1034 to access discrete components of the electronic device 1000 so as to control or manage the middleware 1032, the API 1033, or the application 1034.

The middleware 1032 may perform a mediation role such that the API 1033 or the application 1034 communicates with the kernel 1031 to exchange data. Furthermore, with regard to task requests received from the application 1034, for example, the middle ware 1032 may perform a control (e.g., scheduling or load balancing) on a task request using a method of assigning the priority, which makes it possible to use a system resource (e.g., the bus 1010, the processor 1020, the memory 1030, or the like) of the electronic device 1000, to the at least one application 1034.

The API 1033 may be an interface through which the application 1034 controls a function provided by the kernel 1031 or the middleware 1032, and may include, for example, at least one interface or function (e.g., an instruction) for a file control, a window control, image processing, a character control, or the like.

According to various embodiments of the present disclosure, the application 1034 may include a telephone application, a calculator application, a short messaging service/multimedia messaging service (SMS/MMS) application, an e-mail application, a calendar application, an alarm application, a health care application (e.g., an application for measuring an exercise amount, a blood sugar or the like), an environment information application (e.g., an application for providing air pressure, humidity, temperature information or the like) or the like. Additionally or generally, the application 1034 may be an application associated with information exchange between the electronic device 1000 and an external electronic device (e.g., an electronic device 1004). The application associated with information exchange may include, for example, a notification relay application for transmitting specific information to an external electronic device or a device management application for managing an external electronic device.

For example, the notification relay application may include a function for providing an external electronic device (e.g., an electronic device 1004) with notification information generated from another application (e.g., a message application, an e-mail application, a health care application, an environment information application or the like) of the electronic device 1000. Additionally or generally, the notification relay application, for example, may receive notification information from an external electronic device (e.g., an electronic device 1004) and may provide the notification information to a user. Additionally or generally, the device management application may manage (e.g., install, delete, or update), for example, a function (e.g., turn on/turn off of an external electronic device itself (or a portion of a constituent part) or control of brightness (or resolution) of a screen) of at least a portion of the external electronic device (e.g., an electronic device 1004) communicating with the electronic device 1000, an application operating on the external electronic device, or a service (e.g., a communication (or telephone) service or a message service) provided by the external electronic device.

According to various embodiments of the present disclosure, the application 1034 may include an application that is designated according to an attribute (e.g., the kind of electronic device) of the external electronic device (e.g., an electronic device 1004). For example, in the case where the external electronic device is an MP3 player, the application 1034 may include an application associated with music reproduction. Similarly, in the case that the external electronic device is a mobile medical device, the application 1034 may include an application associated with a health care. According to an embodiment of the present disclosure, the application 1034 may include at least one of an application designated to the electronic device 1000 or an application received from the external electronic device (e.g., a server 1004).

According to various embodiments of the present disclosure, the application 1034 may include a plurality of function applications selectively supporting a telephone function and a calculation function. The plurality of function applications may perform a telephone function or a calculation function corresponding to input key values, based on a type of a value of an execution-requested key (e.g., a physical key or a virtual key displayed). According to various embodiments of the present disclosure, the application 1034 may include a telephone function application supporting a calculation function. Furthermore, the application 1034 may include a calculator application. The calculator application may be activated in response to occurrence of a specific input in performing a telephone function application supporting a calculation function.

The I/O interface 1040 may transmit an instruction or data, input from a user through an input/output device (e.g., a sensor, a keyboard, or a touch screen), to the processor 1020, the memory 1030, the communication interface 1060, or the buffer 1070, for example, through the bus 1010. For example, the I/O interface 1040 may provide the processor 1020 with user's touch data input through a touch screen. Furthermore, the I/O interface 1040 may output an instruction or data, received from the processor 1020, the memory 1030, the communication interface 1060, or the buffer 1070 through the bus 1010, through the input/output device (e.g., a speaker or a display). For example, the I/O interface 1040 may output a calculation result processed through the processor 1020 to the user through a speaker.

The display 1050 may display a variety of information (e.g., multimedia data, text data, and the like) for the user. For example, the display 1050 may output a calculation result of a calculation formula.

The communication interface 1060 may establish communication between the electronic device 1000 and an external electronic device (e.g., an electronic device 1004 or a server 1004). For example, the communication interface 1060 may be connected to a network 1062 through wireless communication or wired communication to communicate with the external electronic device. The wireless communication may include at least one of, for example, wireless-fidelity (Wi-Fi), Bluetooth (BT), near field communication (NFC), global positioning system (GPS), or cellular communication (e.g., 3G, LTE, LTE-A, CDMA, WCDMA, UMTs, WiBro, GSM, or the like). The wired communication may include at least one of, for example, a universal serial bus (USB), a high definition multimedia interface (HDMI), a recommended standard-232 (RS-232), or a plain old telephone service (POTS).

According to an embodiment, the network 1062 may be a telecommunications network. The telecommunications network may include at least one of a computer network, an internet, an internet of things, or a telephone network. According to an embodiment of the present disclosure, a protocol (e.g., a transport layer protocol, a data link layer protocol, or a physical layer protocol) for communication between the electronic device 1000 and an external device may be supported by at least one of the kernel 1031, the middle ware 1032, the application programming interface 1033, the application 1034, or the communication interface 1060.

According to various embodiments of the present disclosure, the server 1006 may drive the electronic device 1000 by performing at least one of operations (or functions) implemented on the electronic device 1000.

The buffer 1070 may store at least a portion of information obtained from other components (e.g., the processor 1020, the memory 1030, the input/output interface 1040, the communication interface 1060, and the like) and may transfer the other components in various methods under a control of the processor 1020. For example, the buffer 1070 may store information on a key value received from the input/output interface 1040 and may output a stored key value or information on a calculation result value to the input/output interface 1040 or the display 1050.

Figure 11:
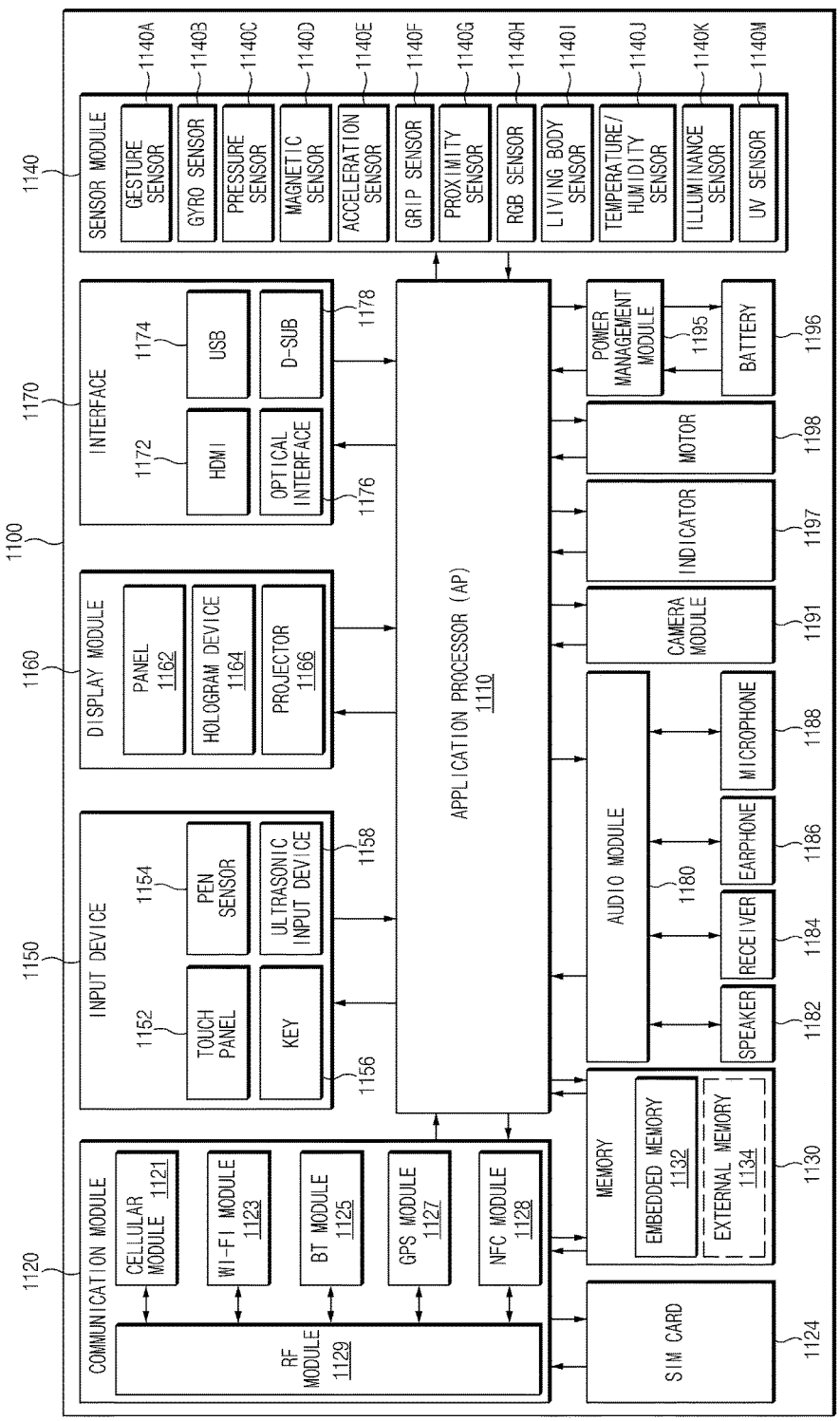
FIG. 11 illustrates a block diagram of an electronic device according to various embodiments of the present disclosure.

FIG. 11 illustrates a block diagram of an electronic device according to various embodiments of the present disclosure.

Referring to FIG. 11, an electronic device 1100 may include all or a part of an electronic device 200 illustrated in FIG. 2 or an electronic device 1100 illustrated in FIG. 10. The electronic device 1100 may include one or more application processors (AP) 1110, a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may drive an operating system (OS) or an application to control a plurality of hardware or software components connected to the AP 1110 and may process and compute a variety of data including multimedia data. The AP 1110 may be implemented with a System on Chip (SoC), for example. According to an embodiment, the AP 1110 may further include a graphic processing unit (GPU) (not illustrated).

The communication module 1120 (e.g., the communication interface 1060) may transmit and receive data when there are conveyed communications between other electronic devices (e.g., an electronic device 1004 or a server 1006) connected with the electronic device 1100 (e.g., the electronic device 1000 or the electronic device 200) through a network. According to an embodiment of the present disclosure, the communication module 1120 may include a cellular module 1121, a wireless-fidelity (Wi-Fi) module 1123, a Bluetooth (BT) module 1125, a global positioning system (GPS) module 1127, a near field communication (NFC) module 1128, and a radio frequency (RF) module 1129.

The cellular module 1121 may provide voice communication, video communication, a character service, an Internet service or the like through a communication network (e.g., an LTE, an LTE-A, a CDMA, a WCDMA, a UMTS, a WiBro, a GSM, or the like). Also, the cellular module 1121 may perform discrimination and authentication of an electronic device within a communication network using a subscriber identification module (e.g., a SIM card 1124), for example. According to an embodiment of the present disclosure, the cellular module 1121 may perform at least a portion of functions that the AP 1110 provides. For example, the cellular module 1121 may perform at least a portion of a multimedia control function.

According to an embodiment of the present disclosure, the cellular module 1121 may include a communication processor (CP). Also, the cellular module 1121 may be implemented with, for example, a SoC. Although components such as the cellular module 1121 (e.g., a communication processor), the memory 1130, the power management module 1195, and the like are illustrated as being components independent of the AP 1110, the AP 1110 may be implemented to include at least a portion (e.g., a cellular module 1121) of the above components.

According to an embodiment of the present disclosure, the AP 1110 or the cellular module 1121 (e.g., a communication processor) may load and process an instruction or data received from nonvolatile memories respectively connected thereto or from at least one of other elements at the nonvolatile memory. Also, the AP 1110 or the cellular module 1121 may store data received from at least one of other elements or generated by at least one of other elements at a nonvolatile memory.

Each of the Wi-Fi module 1123, the BT module 1125, the GPS module 1127, and the NFC module 1128 may include a processor for processing data exchanged through a corresponding module, for example. In FIG. 8, an embodiment of the present disclosure is exemplified as the cellular module 1121, the Wi-Fi module 1123, the BT module 1125, the GPS module 1127, and the NFC module 1128 are separate blocks, respectively. According to an embodiment of the present disclosure, at least a portion (e.g., two or more components) of the cellular module 1121, the Wi-Fi module 1123, the BT module 1125, the GPS module 1127, and the NFC module 1128 may be included within one Integrated Circuit (IC) or an IC package. For example, at least a portion (e.g., a communication processor corresponding to the cellular module 1121 and a Wi-Fi processor corresponding to the Wi-Fi module 1123) of communication processors corresponding to the cellular module 1121, the Wi-Fi module 1123, the BT module 1125, the GPS module 1127, and the NFC module 1128 may be implemented with one SoC.

The RF module 1129 may transmit and receive data, for example, an RF signal. Although not illustrated, the RF module 1129 may include a transceiver, a power amplifier module (PAM), a frequency filter, or low noise amplifier (LNA). Also, the RF module 1129 may further include the following part for transmitting and receiving an electromagnetic wave in a space in wireless communication: a conductor or a conducting wire. In FIG. 11, an embodiment of the present disclosure is exemplified as the cellular module 1121, the Wi-Fi module 1123, the BT module 1125, the GPS module 1127, and the NFC module 1128 are implemented to share one RF module 1129. According to an embodiment of the present disclosure, at least one of the cellular module 1121, the Wi-Fi module 1123, the BT module 1125, the GPS module 1127, or the NFC module 1128 may transmit and receive an RF signal through a separate RF module.

The SIM card 1124 may be a card that includes a subscriber identification module and may be inserted to a slot formed at a specific position of the electronic device. The SIM card 1124 may include unique identify information (e.g., integrated circuit card identifier (ICCID)) or subscriber information (e.g., integrated mobile subscriber identity (IMSI)).

The memory 1130 (e.g., the memory 1030) may include an embedded memory 1132 or an external memory 1134. For example, the embedded memory 1132 may include at least one of a volatile memory (e.g., a dynamic random access memory (DRAM), a static RAM (SRAM), or a synchronous DRAM (SDRAM)) and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 1132 may be a solid state drive (SSD). The external memory 1134 may include a flash drive, for example, compact flash (CF), secure digital (SD), micro secure digital (Micro-SD), mini secure digital (Mini-SD), extreme digital (xD) or a memory stick. The external memory 1134 may be functionally connected to the electronic device 1100 through various interfaces. According to an embodiment of the present disclosure, the electronic device 1100 may further include a storage device (or a storage medium), such as a hard drive.

The sensor module 1140 may measure a physical quantity or may detect an operation state of the electronic device 1100. The sensor module 1140 may convert the measured or detected information to an electric signal. The sensor module 1140 may include at least one of a gesture sensor 1140A, a gyro sensor 1140B, a pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a living body sensor 1140I, a temperature/humidity sensor 1140J, an illuminance sensor 1140K, or an UV sensor 1140M. Although not illustrated, additionally or generally, the sensor module 1140 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (1R) sensor, an iris sensor, a fingerprint sensor, and the like. The sensor module 1140 may further include a control circuit for controlling at least one or more sensors included therein.

The input device 1150 (e.g., the input/output interface 1040 or the input/output interface 210) may include a touch panel 1152, a (digital) pen sensor 1154, a key 1156, or an ultrasonic input unit 1158. The touch panel 1152 may recognize a touch input using at least one of capacitive, resistive, infrared and ultrasonic detecting methods. Also, the touch panel 1152 may further include a control circuit. In the case of using the capacitive detecting method, a physical contact recognition or proximity recognition is allowed. The touch panel 1152 may further include a tactile layer. In this case, the touch panel 1152 may provide a tactile reaction to a user. The touch panel 1152 may generate a touch event associated with execution of a specific function using position associated information.

The (digital) pen sensor 1154 may be implemented in a similar or same manner as the method of receiving a touch input of a user or may be implemented using an additional sheet for recognition. The key 1156 may include, for example, a physical button, an optical key, a keypad, and the like. The ultrasonic input device 1158, which is an input device for generating an ultrasonic signal, may enable the electronic device 1100 to sense detect a sound wave through a microphone (e.g., a microphone 1188) so as to identify data, wherein the ultrasonic input device 1158 is capable of wireless recognition. According to an embodiment the present disclosure, the electronic device 1100 may use the communication module 1120 so as to receive a user input from an external device (e.g., a computer or server) connected to the communication module 1120.

The display 1160 (e.g., a display 1050) may include a panel 1162, a hologram device 1164, or a projector 1166. The panel 1162 may be, for example, flexible, transparent or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be arranged in the inside or the outside of the electronic device 1100. According to an embodiment of the present disclosure, the display 1160 may further include a control circuit for controlling the panel 1162, the hologram device 1164, or the projector 1166.

The interface 1170 may include, for example, an HDMI (high-definition multimedia interface) 1172, a USB (universal serial bus) 1174, an optical interface 1176, or a D-sub (D-subminiature) 1178. The interface 1170 may be included, for example, in a communication interface 1060 illustrated in FIG. 10. Additionally or generally, the interface 1170 may include, for example, a mobile high definition link (MHL) interface, a SD card/multi-media card (MMC) interface, or an infrared data association (IrDA) standard interface.

The audio module 1180 may convert a sound and an electric signal in dual directions. At least a portion of the audio module 1180, for example, may be included in an input/output interface 1040 illustrated in FIG. 10. The audio module 1180 may process, for example, sound information that is input or output through a speaker 1182, a receiver 1184, an earphone 1186, or a microphone 1188.

According to an embodiment of the present disclosure, the camera module 1191 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 1195 may manage power of the electronic device 1100. Although not illustrated, a power management integrated circuit (PMIC) a charger IC, or a battery or fuel gauge may be included in the power management module 1195.

The PMIC may be mounted on an integrated circuit or a SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier, and the like.

The battery gauge may measure, for example, a remaining capacity of the battery 1196 and a voltage, current or temperature thereof while the battery is charged. The battery 1196 may store or generate electricity, and may supply power to the electronic device 1100 using the stored or generated electricity. The battery 1196 may include, for example, a rechargeable battery or a solar battery.

The indicator 1197 may display a specific state of the electronic device 1100 or a part thereof (e.g., the AP 1110), such as a booting state, a message state, a charging state, and the like. The motor 1198 may convert an electrical signal into a mechanical vibration. Although not illustrated, a processing device (e.g., a GPU) for supporting a mobile TV may be included in the electronic device 1100. The processing device for supporting a mobile TV may process media data according to the standards of DMB, digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors (e.g., the processor 1110), may cause the one or more processors to perform a function corresponding to the instruction. The computer-readable storage media, for example, may be the memory 1130. At least a portion of the programming module, for example, may be implemented (e.g., executed) by the application processor 1110. At least a portion of the programming module may include the following for performing one or more functions: a module, a program, a routine, sets of instructions, or a process.

A computer-readable recording medium may include a hard disk, a magnetic media such as a floppy disk and a magnetic tape, an optical media such as Compact Disc Read Only Memory (CD-ROM) and a Digital Versatile Disc (DVD), a magneto-optical media such as a floptical disk, and the following hardware devices specifically configured to store and perform a program instruction (e.g., a programming module): Read Only Memory (ROM). Random Access Memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, a storage medium may store instructions, the instructions, when executed by at least one processor causing the at least one processor to perform at least one operation, the at least one operation may include receiving an input on at least one number key from a user, storing a key value selected by the input at a buffer, receiving a specific input from a user, determining whether the specific input is associated with a calculation function or a telephone function, and performing a telephone function or a calculation function using the stored key value, based on the determination result.

According to various embodiments of the present disclosure, a user may perform a calculation function effectively without searching for and executing a calculator application. For example, various embodiments may allow a user to access a calculator function conventionally and intuitionally when needed, thereby make it possible for the user to use the calculator function instantly. Furthermore, the various embodiments may allow a user to selectively use a telephone function or a calculator function without selecting a telephone mode/calculator mode at a dial keypad.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch screen display;
   a buffer; and
   a controller electronically connected to the touch screen display and the buffer, the controller configured to:
   execute an application presenting an interface including a plurality of number keys and function keys on the touch screen display, the function keys including a first button for a telephone function and a second button for at least a calculator function;
   store key values selected by a user via the interface presented in the touch screen display;
   receive a user input on the first button or the second button of the interface via the touch screen display;
   make a call using the stored key values selected by the user via the interface if the user input corresponds to the first button for the telephone function included in the interface; and
   perform a calculation function using the stored key values selected by the user via the interface if the user input corresponds to the second button for the calculator function included in the interface.

2. The electronic device of claim 1, wherein the buffer is configured to store a number corresponding to an arbitrary key when a first type input occurs with respect to the arbitrary key of the plurality of number keys, and
   wherein the controller is configured to control output of a pop-up button including a plurality of operators for executing the calculation function to the interface when a second type input occurs with respect to the arbitrary key.

3. The electronic device of claim 2, wherein the second type input is a long touch input on the arbitrary key, and
   wherein the plurality of operators includes at least two of four arithmetical operators.

4. The electronic device of claim 3, wherein the pop-up button further comprises a button for switching into a calculator application.

5. The electronic device of claim 2, wherein the pop-up button comprises buttons on the operators arranged at a button area adjacent to the arbitrary key.

6. The electronic device of claim 2, wherein the controller is configured to generate a key input on an operator assigned to the arbitrary key when the second type input occurs with respect to the arbitrary key.

7. The electronic device of claim 6, wherein when an input on a specific operator of a plurality of operators included in the pop-up button occurs, the controller is configured to replace the key input on the operator assigned to the arbitrary key with a key input on the specific operator.

8. The electronic device of claim 2, wherein a symbol automatically output when the first type input occurs is deleted when the second type input occurs.

9. The electronic device of claim 1, wherein the touch screen display is further configured to provide a plurality of operator keys for performing the calculation.

10. The electronic device of claim 1, wherein when a user input satisfies a specific condition, the controller is configured to allow at least a portion of the interface to switch into an interface for performing a calculation function.

11. The electronic device of claim 1, wherein the controller is configured to allow the interface to switch into an interface for performing a calculation function when a combination of stored key values does not satisfy at least a portion of a telephone number format.

12. The electronic device of claim 1, wherein the controller is configured to allow the interface to change when a predefined touch and drag input on a given number key occurs.

13. The electronic device of claim 12, wherein the controller is configured to control the buffer to retain the stored key values when the interface is changed.

14. The electronic device of claim 1, wherein the buffer is configured to store a calculation formula input through the interface, and
   wherein the controller is configured to ignore at least one operator included in the calculation formula if the user input corresponding to the first button for the telephone function occurs via the interface.

15. A method for providing a calculation function and a telephone function by an electronic device, the method comprising:
   executing, by the electronic device, an application presenting an interface including a plurality of number keys and function keys on a touch screen display, the function keys including a first button for the telephone function and a second button for at least the calculator function;
   storing key values selected by a user via the interface presented in a touch screen display of the electronic device to a buffer of the electronic device;
   receiving a user input on the first button or the second button of the interface via the touch screen display;
   making a call using the stored key values selected by the user via the interface when the user input corresponds to the first button for the telephone function included in the interface; and
   performing a calculation function using the stored key values selected by the user via the interface when the user input corresponds to the second button for the calculation function included in the interface.

16. The method of claim 15, further comprising:
   providing an interface including at least one number key at a lock state of an electronic device, and
   wherein the input on the at least one key is performed at the lock state.

17. The method of claim 15, further comprising:
   providing an interface including at least one number key at a call state of an electronic device, and
   wherein the input on the at least one key is performed at the call state.

18. The method of claim 17, further comprising:
   stopping a dual-tone multi-frequency (DTMF) function when a specific key is selected at the interface.

19. The method of claim 15, further comprising:
   processing an inappropriate key to be appropriate to perform the telephone function or the calculation function, when the stored key value includes the inappropriate key inappropriate to perform the telephone function or the calculation function.

20. A non-transitory recording medium storing one or more computer-readable instructions, the one or more computer-readable instructions, when executed by a processor, causing an electronic device to perform:

executing, by the electronic device, an application presenting an interface including a plurality of number keys and function keys on a touch screen display, the function keys including a first button for a telephone function and a second button for at least the calculator function;

storing key values selected by a user via the interface presented in a touch screen display of the electronic device to a buffer of the electronic device;

receiving a user input on the first button or the second button of the interface via the touch screen display;

making a call using the stored key values selected by the user via the interface when the user input corresponds to the first button for the telephone function included in the interface; and performing a calculation function using the stored key values selected by the user via the interface when the user input corresponds to the second button for the calculation function included in the interface.

\* \* \* \* \*